United States Patent [19]

Koeppe

[11] Patent Number: 4,868,825
[45] Date of Patent: Sep. 19, 1989

[54] METHOD FOR SIMULATING AN OPEN FAULT IN A LOGIC CIRCUIT COMPRISING FIELD EFFECT TRANSISTORS AND SIMULATION MODELS FOR IMPLEMENTING THE METHOD

[75] Inventor: Siegmar Koeppe, Laatzen, Fed. Rep. of Germany

[73] Assignee: Siemens Aktiengesellschaft, Berlin and Munich, Fed. Rep. of Germany

[21] Appl. No.: 56,894

[22] Filed: Jun. 3, 1987

[30] Foreign Application Priority Data

Jun. 6, 1986 [DE] Fed. Rep. of Germany ....... 3619066

[51] Int. Cl.$^4$ ............................................. G06F 15/20
[52] U.S. Cl. ....................................... 371/23; 364/578
[58] Field of Search ...................... 371/23, 20, 26, 15; 364/578; 324/73 R, 73 AT, 73 PC

[56] References Cited

U.S. PATENT DOCUMENTS

| | | | |
|---|---|---|---|
| 3,715,573 | 2/1973 | Vogelsberg | 371/23 |
| 3,780,277 | 12/1973 | Armstrong | 371/23 |
| 4,156,132 | 5/1979 | Hazzard | 371/23 |
| 4,228,537 | 10/1986 | Henckels | 371/23 |
| 4,242,751 | 12/1980 | Henckels | 371/23 |
| 4,308,616 | 12/1981 | Timoc | 371/23 |
| 4,342,093 | 7/1982 | Miyoshi | 371/23 |
| 4,669,083 | 5/1987 | Laviron | 371/23 |

OTHER PUBLICATIONS

Jain et al., "Test Generation . . . D. Algorithm", Proc. 20th Design Automation Conf., 1983, pp. 64–70.
Wadsack R. L. "Fault Modeling . . . Integrated Circuits", Bell System Technical Journal, vol. 57, No. 5, May–Jun. 1978, pp. 1449–1459.

Primary Examiner—Michael R. Fleming
Attorney, Agent, or Firm—Hill, Van Santen, Steadman & Simpson

[57] ABSTRACT

A method for simulating an open fault in a logic circuit comprising field effect transistors utilizes a simulation model which is employed and which takes the fault condition signal storage into consideration by way of an output stage. Given the appearance of a fault-influence signal at the output of a simulation stage, this maintains the through-connection of the signal which appeared immediately before the influenced signal to the simulation model output. In order to take reloading events in the real logic circuit into consideration, this through-connection is canceled after a prescribable time interval.

13 Claims, 2 Drawing Sheets

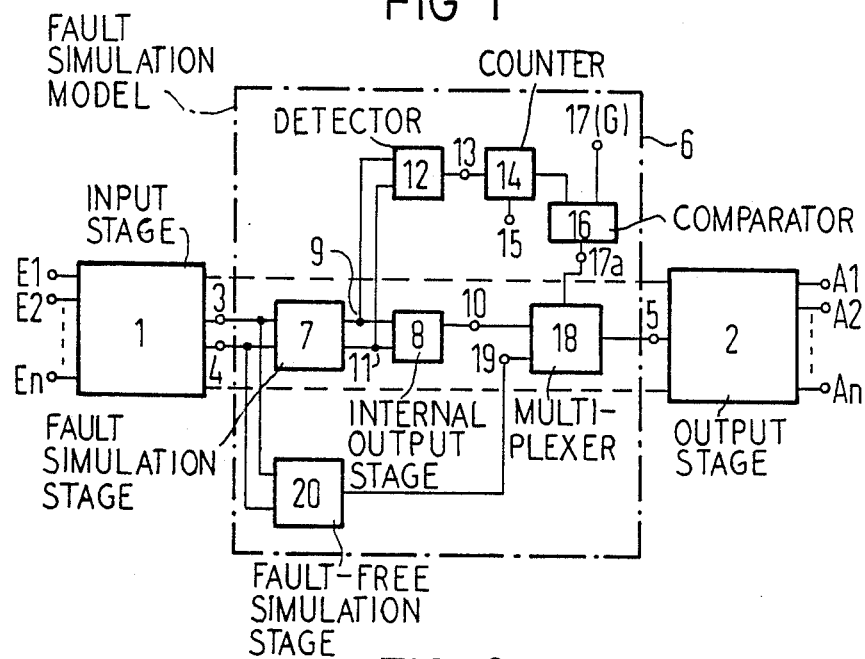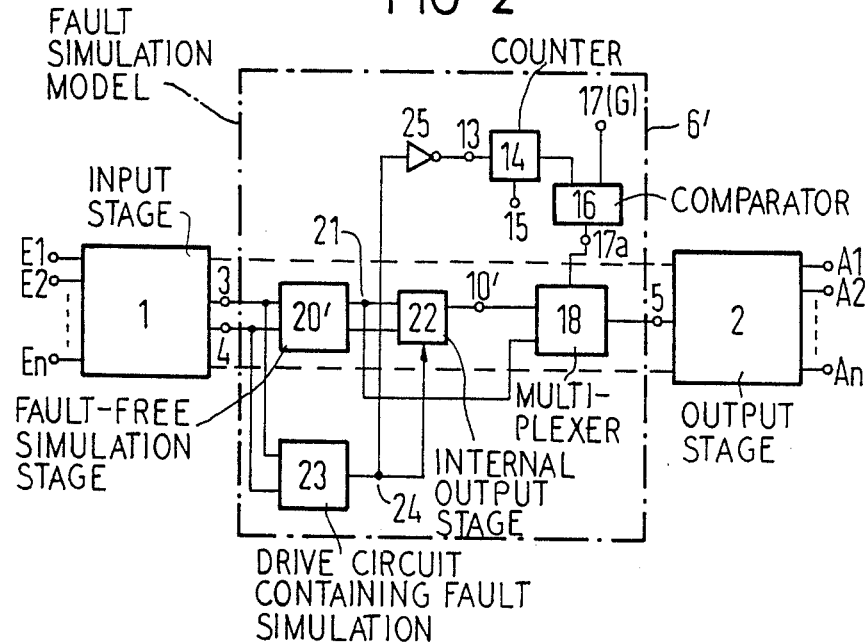

METHOD FOR SIMULATING AN OPEN FAULT IN A LOGIC CIRCUIT COMPRISING FIELD EFFECT TRANSISTORS AND SIMULATION MODELS FOR IMPLEMENTING THE METHOD

CROSS-REFERENCE TO RELATED APPLICATION

This application is related to application Ser. No. 056,896 filed June 3, 1987.

1. Field of the Invention

The present invention relates to a method for simulating a so called "stuck-open" fault in a logic circuit comprising field effect transistors, whereby output bit patterns are derived from a sequence of input bit patterns respectively applied in successive clock periods, the derivation being by way of a simulation model containing the fault, the output bit patterns being compared to reference patterns which are true for a fault-free case, and in which a signal storage appearing at a circuit point of the logic circuit which is directly caused by the open is taken into consideration by the operation of an output stage which through-connects a signal appearing at the circuit point which is not influenced by the opening and, given appearance of a signal influenced by the open, continues to maintain the through connection of a signal which appeared at the circuit point immediately before. The invention is also concerned with simulation models for implementing this method.

2. Description of the Prior Art

A general discussion of the so call "stuck-open" fault in logic circuits, and the design of simulation models and methods, is set forth in Fault Modeling "fault modeling and Logic Simulation of CMOS and MOS Integrated Circuits," Wadsack, System technical Journal, May/June 1978, pp. 1449–1458. It is thereby assumed that a stuck-open fault in a logic circuit to be tested for functionability produces a signal at an internal circuit point. When it is assumed, in particular, that this circuit point exhibits a capacitance of adequate size, therefore, for example when it simultaneously represents the input of a following field effect transistor stage affected with a gate capacitance and when a fault-conditioned isolation of the circuit point from the beginning, i.e. driving portion of the logic signal occurs, then the fault-conditioned isolation of the circuit point from the beginning, i.e. driving portion of the logic signal occurs, then the charge state of the capacitance respectively present when the fault occurs is preserved. As a consequence of the signal storage, it is necessary to supply a logic circuit under test with two input bit patterns for the recognition of an open fault, the first bit pattern being referred to as an initialization pattern and the second as a fault recognition pattern. Whereas the former places the circuit point of the logic circuit at a first level, for example at a logical "1", the latter causes that the circuit point which would thereby be reloaded to a second level, for example, to a logical "0" in the fault-free case, continues to remain at the first level because of the open fault. For error simulation on the gate level, the faulty behavior of individual transistors must be modeled by an equivalent gate circuit. The signal storage is thereby taken into consideration by an output stage of the simulation model of the logic circuit which through-connects every signal appearing at the circuit point which is not influenced by the stuck-open fault to the output of the simulation model but which, upon appearance of the signal influenced by the stuck-open fault, continues to maintain the through-connection of the signal which appeared at the circuit point immediately before.

After the application of an initialization pattern which places the output of the simulation model at the first level, the following application of a fault recognition pattern leads, for example, to the fact that the output stage continues to maintain the through-connection of the first level. The stuck-open fault could therefore be immediately recognized at the output of the simulation model since, of course, the second level would have to appear at the output in the fault-free case.

Since, however, the simulation model of the logic circuit generally simulates only a portion of a more extensive digital circuit, the output of the simulation model in fault simulation is usually connected by way of further digital circuit branches to a digital circuit output at which output patterns derived by way of the simulation model given application of bit patterns at the input side are undertaken. Due to the gates located in the further digital circuit branches which can be temporarily inhibited dependent on the bit patterns at the input side, a difficulty exists in that the faulty signal deviation which has appeared at the output of the simulation model cannot be directly observed as the digital circuit output. It is therefore usually necessary to supply the simulation model with a plurality of further, error recognition patterns in the following clock periods before an observation of the faulty signal deviation is, in fact, established at the digital circuit output.

Given application of a plurality of fault recognition patterns in a corresponding plurality of clock periods, a time interval proportional to this plurality of clock periods elapses, the first level being preserved at the output of the simulation model during this time interval because of the function of the output stage. However, reloading events can have occured at the logic circuit under test within this time interval due to stray currents, these reloading events having changed the level at the output of the logic circuit under test to such a degree that the following circuit portions recognize it as a second level which, of course, would be anticipated without the stuck-open fault. In this case, the sequence of fault recognition patterns which leads to the recognition of a stuck-open fault at a digital circuit output only after the time interval when the simulation model is charged would no longer enable a recognition of the stuck-open fault defined in the simulation model when the actual digital circuit to be tested is traversed. Therewith, the use of the above-described simulation model comprising an output stage which undertakes the described level through-connections results in input bit patterns whose application leads to an excessively high fault recognition rate.

SUMMARY OF THE INVENTION

The object of the present invention is to provide a method of the type set forth above in which the uncertainties of the recognition of overfaults are largely suppressed.

The above object is achieved, according to the present invention, in a method for the simulation of an open fault in a logic circuit comprising field effect transistors, whereby output bit patterns are derived from a sequence of input bit patterns respectively applied in successive clock periods and derived via the simulation model containing the fault. The output bit patterns are compared to reference patterns valid for a fault-free case. A signal storage appearing at a circuit point of the logic circuit which is directly caused by the open fault is taken into consideration by the function of an output stage, which through-connects a signal appearing at the circuit point if it is not influenced by the open fault but, given appearance of a signal influenced by a stuck-open fault, maintains the through-connection of the signal which appeared at the circuit point immediately before the signal influenced by the stuck-open fault. The method is particularly characterized in that the maintenance of the through-connection of the immediately preceding (i.e. fault-free) signal is concluded given appearance of further signals influenced by the stuck-open fault in the following clock periods, when the plurality of signals influenced by the stuck-open faults which have appeared at the circuit point exceed a prescribed limit value.

The advantage obtained with the method of the present invention is particularly that a maximum time interval can be prescribed within which no reloading of such magnitude that the recognition of this fault is made more difficult or impossible can yet have occurred at the output of a logic circuit to be tested for functionability, in particular cannot yet have occurred in the case of a stuck-open fault. A fault recognition which would not occur until after the expiration of the maximum time interval is quite consistently not allowed in the simulation method of the present invention, whereby the beginning of the maximum time interval coincides with the initialization of a stuck-open fault. What is thereby prevented is that bit patterns in the simulation qualify as fault recognition patterns, these bit patterns not being in the position to reliably guarantee a recognition of the simulated stuck-open fault in the real logic circuit affected by stray currents.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a schematic representation of a first simulation model constructed in accordance with the present invention;

FIG. 2 is a schematic representation of a second simulation model constructed in accordance with the present invention;

DESCRIPTION OF THE PREFERRED EMBODIMENTS

Figure 3:
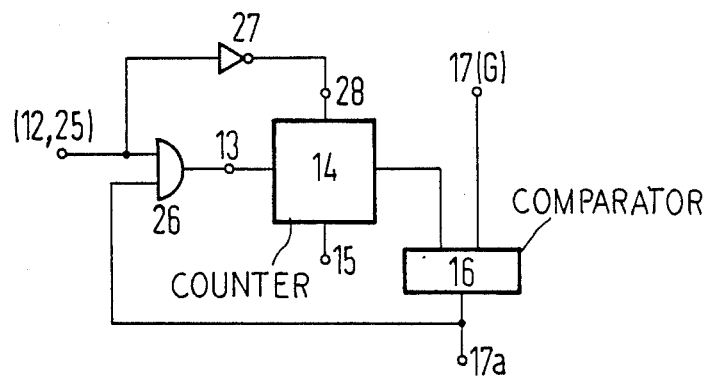
FIG. 3 is a schematic representation of a preferred embodiment of a subcircuit of FIG. 1 or FIG. 2.

FIG. 1 illustrates digital circuit which contains a an input stage 1 and an output stage 2. The portion 1 comprises a series of digital inputs E1, E2 ... En. The output stage 2 has a series of digital outputs A1, A2 ... An. A logic circuit to be tested for the purpose of stuck-open faults, which has its inputs connected to the outputs 3 and 4 of input stage 1 and has its output connected to an input 5 of the output stage 2 is simulated by a simulation model 6. In a simulation method, a stuck-open fault is provided in the simulation model and a sequence of n-place bit patterns is applied to the inputs E1 ... En in a plurality of successive clock periods. The output patterns respectively derived via the elements 1, 6 and 2 then appear at the output A1 ... An, these output patterns being registered and compared to reference patterns which are valid for a fault-free case. Each input bit pattern which leads to an output pattern which deviates from the corresponding reference pattern in terms of at least one bit is qualified as a fault recognition pattern. When a fault recognition pattern identified in this manner is supplied to the digital circuit being tested, i.e., the simulation model 6 is replaced by a real logic circuit, then a conclusion regarding the presence of the simulated open fault in the real logic circuit can be drawn in the event of an output pattern, which corresponds to the pattern which occurred in the simulation method as a consequence of the simulated fault, appearing at the outputs A1 ... An.

The simulation model comprises a simulation stage 7 which simulates a logic circuit affected by stuck-open fault. The effect of signal storage provided by the stuck-open fault is taken into consideration by an internal output stage 8 which has its two inputs connected to two outputs 9 and 11 of the simulation stage 7. The output of the output stage 8 is referenced 10. The output stage 8 has the function of through-connecting each signal appearing at the output 9 of the simulation stage 7 which is not influenced by the stuck-open fault simulated in the simulation stage 7 to its output 10 but, given the appearance of a signal at the output 9 which is influenced by the simulated fault, does not through-connect this signal, but rather maintains the through-connection of the last signal that had appeared before the appearance of the fault-influence signal at the output 9. The control of the output stage 8 occurs in dependence on the signals appearing at the outputs 9 and 11 of the simulation stage 7. The simulation stage 7 is thereby constructed such that a signal influenced by the stuck-open fault is present at the output 9 whenever a respective logical "0" appears at each of the two outputs 9 and 11.

The Proceedings of the 20th Design Automation Conference, 1983, pp. 64–70 shows and describes a few gate circuits and the corresponding simulation stages including the appertaining output stages. For example, FIG. 1 of this publication shows a complementary-metal-oxide-semiconductor (CMOS) gate and FIG. 3 shows the corresponding simulation and output stage. FIG. 3 also refers to the output stage 8 as a logic block B whose function table, which may be derived from Table I on Page 65, coincides with that of a RS flip-flop.

A check is carried out in a detector 12 which has its two inputs connected to the outputs 9 and 11 to see whether the simulation stage 7 is in a switch state at which a logical "0" appears at both of the terminals 9 and 11. When this is the case, then a logical "1" is produced at the output 13 of the detector 12. The detector 12 can be a NOR gate. The output signal of the detector 12 is supplied to the output 13 which is the control input of a resettable counter 14 whose clock input 15 is connected to receive clock pulses which effect an up-dating of the counter reading once per clock period. When a logical "1" is applied to the control input 13, then the counter, initially reset to zero, counts upwardly by way of the clock pulses applied to the input 15. When, therefore, the condition in which the outputs 9 and 11 are each at a logical "0" continues to exist during, for example, the duration of n successive clock periods, then the signal which appeared at the output 9 immediately before the appearance of this condition is through-connected to the output 10 for the duration of the n clock periods, whereby the counter 14, due to the logical "1" applied for the duration of n clock periods, counts up until the counter contents n is reached.

In a comparator 16, the counter contents, for example n, is compared to a limit value G which is input by way of an input 17. When the counter contents n is less than or equal to the limit value G, then a logical "1" is output at the output 17a of the comparator 16, the logical "1" being supplied to the control input of a multiplexer 18. When, however, the value n exceeds the limit value G, then the output 17a of the comparator 16 emits a logical "0". Given reception of a control signal "1", the multiplexer 18 connects the signals at its first input, which is connected to the output 10 of the output stage 8, to its output 5. Given appearance of a control signal "0", by contrast, the signals applied to the output 10 are disconnected from the output 5 and the signals that are applied to the second input 19 of the multiplexer 18 are instead through-connected to the output 5. The input 19 is connected to the output of a fault-free simulation stage 20 which is driven in parallel which the simulation stage 7 and which is constructed such that it simulates the fault-free function of the logic circuit to be tested.

What is achieved by the elements 12–20 is that, when the counter contents n exceeds the prescribed limit value G, the comparator output signal disconnects the output 5 of the multiplexer from the signal applied at the output 10 and switches it to the signal at the output of the fault-free simulation stage 20. This, however, means that the signal which is not influenced by the simulated stuck-open fault is through-connected to the output of the simulation model 6 when the limit G is exceeded. The freely-selectible limit value G prescribes a maximum time interval within which a fault recognition is enabled by the signal stored at the output 10 of the output stage 8, this signal serving as an initialization signal for the recognition of the struck-open fault of the simulation stage 7. After this maximum time interval has elapsed, the switching of the multiplexer 18 prevents a fault recognition on the basis of the initialization signal. What is thereby taken into consideration is the fact that, within the maximum time interval, the circuit point in the real logic circuit affected by parasitic effects such as, for example, stray currents, and at which a signal storage occurs, can have been reloaded to such a degree that the initialization is already canceled and is replaced by the complementary logic signal. Since the simulated fault could no longer be reliably perceived after the maximum time interval has elapsed in the realized circuit, a corresponding fault recognition is likewise prevented in the simulation method.

FIG. 2 illustrates an embodiment of a simulation model which departs from that of FIG. 1, the model being referenced 6'. A fault-free simulation stage 20' of the logic circuit to be tested is thereby provided with two inputs which are connected to the outputs 3 and 4 of the portion 1 of the digital circuit. The output 21 of the model 20 is connected to a first input of the multiplexer 18 by way of an output stage 22, whose output is referenced 10', whereas the second input of the multiplexer 18 is connected to the output 21 of the model 20'. A drive circuit 23, provided with a simulated stuck-open fault and which is driven parallel to the model 20' via the outputs 3 and 4, emits a logical "1" via its output 24 upon application of input signals which lead to an output signal of the logic circuit which is not influenced by the simulated open fault, this logical "1" switching the output stage 22 conductive for the signals applied by way of the output 21 so that the latter proceed to the output 10'. When, however, a bit pattern of the input is applied to the simulation model 6' via the outputs 3 and 4, which bit pattern leads to a signal at the output of the logic circuit which is influenced by the simulated open fault, then the logical signal "0" appears at the output 24, this preventing the transmission of the signal simultaneously applied at the output 21 before the interruption of the signal path 21-10'. The signal appearing at the circuit point 24 and controlling the output stage 22 is also supplied at an inverter 25 whose output signal is applied to the control input 13 of the resettable counter 14. The remaining circuit portions of FIG. 2 correspond in terms of structure and operation to the circuit portions of FIG. 1 bearing identical references. Given the occurrence of the condition that the counter contents n exceeds the limit value G, the multiplexer 18 is also driven in FIG. 2 such that, instead of the signal applied at the terminal 10', the signal applied at the terminal 21 which is not influenced by the open fault is through-connected to the output 5 of the simulation model 6'.

Figure 4:
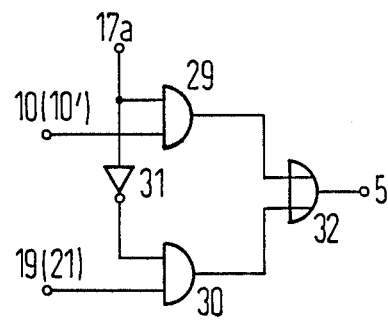
FIG. 4 is a schematic representation of a preferred embodiment of another subcircuit of FIG. 1 or of FIG. 2.

The simulation model described in the Bell System Technical Journal, May/June 1978, pp. 1455–1458, particularly in FIGS. 3 and 4, corresponds to the portions 20, 22 and 23 of FIG. 2. The significant disadvantage thereby occurs, however, that a maximum time interval for the recognition of an open fault cannot be defined.

The resettable counter 14, which is to be interpreted as lockable or overflow-protected in FIGS. 1 and 2, can also advantageously be equipped with an external interlock as indicated in FIG. 3. It is thereby driven by way of the output 17a of the comparator 16. The output signal of the comparator 16 is thereby supplied to the first input of an AND gate 26 whose second input is connected to the output of the detector 12 or, respectively, to the output of the inverter 25. The output of the AND gate 26 is connected to the control input of the counter 14. Furthermore, the second input of the AND gate 26 is connected to the reset input 28 of the counter 14 by way of an inverter 27. What is thereby achieved is that the counter 14 is latched by the logical signal "0" at the output 17a of the comparator 16 when its contents exceeds the limit value G. As a result of the inhibited AND gate 26, its control input 13 is not influenced by further signals received by way of the output 12 or the output 25. The resetting of the counter 14 occurs by way of a logical "0" which is received via the output 12 or the output 25.

The interlock or the latching of the counter 14 makes it impossible for continued counting of the incoming clock pulses after the limit value G has been exceeded to lead to a transgression of the maximum counting capacity, which would automatically mean a resetting of the counter to "0", so that the limit value conditions n would be invalidated.

FIG. 4 illustrates an advantageous embodiment of the multiplexer 18. Two AND gates 29 and 30 are thereby provided, their first inputs being connected to one another by way of an inverter 31. Furthermore, the first input of the AND gate 29 is connected to the output 17a of the comparator 16. The second input of the AND gate 29 in the simulation model 6 is connected to the output 10 of the output stage 8, whereby the second input of the AND gate 30 corresponds to the circuit point 19 of FIG. 1. The outputs of the AND gates 29 and 30 are connected to the inputs of an OR gate 32 whose output then represents the output 5 of the multiplexer. In case of the simulation model 6' in FIG. 2, the second input of the AND gate 29 is connected to the circuit point 10' and the second input of the AND gate 30 is connected to the circuit point 21.

Figure 5:
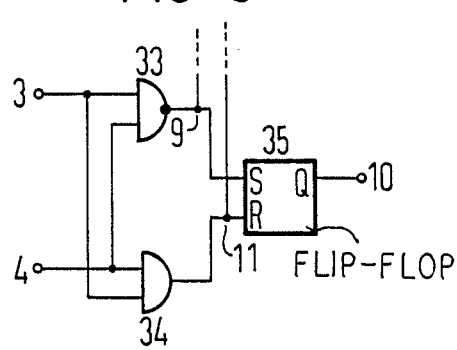
FIG. 5 is a schematic representation of a portion of a simulation model for the function check of a NAND gate.

FIG. 5 illustrates the circuit-oriented realization of a simulation stage 7 utilized in the simulation model 6 of FIG. 1 and of an appertaining output stage 8 which serves for the simulation of a NAND gate comprising two inputs of complementary circuit technology. The NAND gate 33 and an AND gate 34 thereby have their first inputs connected to the circuit point 3, whereas their second inputs are connected to the circuit point 4. The output of the NAND gate 33 is connected to the set input S of a RS flip-flop 35. The output of the AND gate 34 is connected to the reset input R of the flip-flop 35. The output Q of the RS flip-flop 35 corresponds to the circuit point 10 of FIG. 1. A stuck-open fault in one of the two parallel branches of the simulated NAND gate is simulated by a fault at the first input of the NAND gate 33. A stuck-open fault in the other of the two parallel branches is simulated by a fault at the second input of the NAND gate 33. These two faults which are fashioned as "stuck-at-1" faults are, in turn, simulated by a disconnection of the respective input from the circuit point 3 or, respectively, from the circuit point 4 and by the application of a level corresponding to a logical "1" to the respectively disconnected input of the NAND gate 33. A stuck-open fault in the series branch of the simulated NAND gate is simulated by a fault at the output of the AND gate 34. This fault is fashioned as a "stuck-at-0" fault and therefore simulates that the reset input R of the flip-flop 35 is disconnected from the output of the AND gate 34 and is provided with a level which corresponds to a logical "0".

Figure 6:
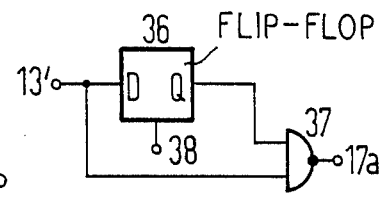
FIG. 6 is a schematic representation of a particular feature of a branch circuit of the simulation model of FIG. 1 or FIG. 2 which serves for the construction of a preferred alternative of the method of the present invention.

The limit value G for the plurality of clock periods by which the charge at the circuit point of the logic circuit under test, isolated by the stuck-open fault, is sure to be preserved is dependent on technology and structure since a higher capacitance at the circuit point also corresponds to a longer holding time and, therefore, to a higher limit value. When, however, the limit value is unknown, then the most unfavorable case which corresponds to a limit value of "1" can be assumed. This means that a storage capability of one clock period is assumed at the circuit point. In this case, the circuit portions of FIG. 1 and FIG. 2 lying between the circuit points 13 and 17a can be replaced by a greatly simplified subcircuit of the type illustrated in FIG. 6. The circuit points 13 of FIG. 1 and FIG. 2 thereby corresponds to the circuit point 13' in FIG. 6. The circuit point 13' forms the input of the D flip-flop 36. The output Q of the D flip-flop 36 is connected to a first input of a NAND gate 37 whose second input is connected to the circuit point 13'. The output of the NAND gate 37 forms the circuit point 17a in FIG. 1 or in FIG. 2. A clock input 38 is provided for the D flip-flop 36 and is supplied with clock pulses.

A logical "1" applied at the circuit point 13' is transmitted to the output Q given the appearance of the following clock pulse at the input 38. When a logical "1" continues to be applied at the circuit point 13' during the clock period defined by this clock pulse, this corresponding to a time interval of two clock periods in accordance with the above explanations provided with reference to FIG. 1, then the NAND gate 37 is provided with a logical "1" by way of each of its inputs. This, however, means an upward transgression of the limit value G=1 at which the output 17a is switched from a logical "1" to a logical "0". The reset function is likewise guaranteed since the gate 37, given a logical "0" at the input 13', cancels a latching and a logical "1" is again set at the output 17a. The limit value G=1 is therefore simulated in a very simple manner by the function of the D flip-flop 36 and of the NAND gate 37.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A method for simulating an open fault in a logic circuit comprising field effect transistors in which output bit patterns are derived from a sequence of input bit patterns respectively applied in successive clock periods to a simulation model containing the fault, the output bit patterns being compared to reference patterns valid for fault-free operation of said logic circuit, and in which a storage signal which appears at a certain point of the logic circuit which is directly caused by the stuck-open fault is used to control the operation of an output stage, said output stage through-connecting appearing at the circuit point which is not influenced by the stuck-open fault to its output and, given the appearance of a signal influenced by the stuck-open fault, maintains the through-connection of the preceding signal, not influenced by the stuck-open fault, which appeared at the circuit point immediately therebefore, comprising the steps of:

detecting the persistence of signals influenced by a stuck-open fault which have appeared at the circuit point; and maintaining the through-connection of the immediately preceding signal while detecting said signals influenced by the stuck-open fault and terminating maintenance of the preceding signal in response to the appearance of further signals influenced by the open fault in following successive clock periods if and when the persistence of said signals influenced by the stuck-open fault exceeds a predetermined time.

2. The method of claim 1, comprising the additional step of: upon termination of the through-connection of the preceding signal, replacing the preceding signal with a signal resulting from a fault-free simulation of the logic circuit.

3. The method of claim 2, wherein:

said predetermined time in one clock period so that the maintenance of the through-connection of the preceding signal is terminated by a single, further signal at the circuit point influenced by the stuck-open fault.

4. A method as claimed in claim 1, wherein the step of maintaining the through-connection of the immediately preceding signal is further defined by the steps of;
   counting the number of clock periods in which a signals influenced by a stuck-open fault persists;
   comparing the number of counted periods with a fixed count; and
   terminating maintenance of the preceding signal if and when the number of counted periods exceeds said fixed count.

5. A method as claimed in claim 4 comprising additional step of:
   setting said fixed count at one clock period.

6. A stimulation model for simulating a stuck-open fault in a logic circuit which comprises field effect transistors, and in which output bit patterns are derived from a sequence of input bit patterns respectively applied in successive clock periods to the simulation model containing the stuck-open fault, the output bit patterns being compared to reference patterns valid for fault-free operation of said logic circuit, said model comprising:
   a simulation stage means for simulating the stuck-open fault in said logic circuit;
   an output stage means connected to said simulation stage for simulating a logic circuit affected by the stuck-open fault, said simulation stage means including first and second outputs connected to said output stage means and said output stage means including an output, sad output stage including means responsive to a signal appearing at said first output of said simulation stage which is not influenced by the stuck-open fault for through-connecting said signal to said output of said output stage means and responsive to a signal at said first output of said simulation stage which is influenced by the stuck-open fault through-connecting a preceding signal not influenced by said stuck-open fault which has appeared immediately therebefore;
   a detector means connected to said first and second outputs of said simulation stage means for producing an output signal in response to a signal at said first and second outputs indicating a stuck-open fault;
   a resettable counter connected to said detector means and including a clock input for receiving clock pulses corresponding to said clock periods, said resettable counter being enable by the output signal of said detector means to add clock pulses received via the clock input;
   a comparator including a first input connected to said counter to receive the counter contents and a second input for receiving a limit value corresponding to a maximum persistence time of said output signal in successive clock periods to be compared in said comparator to the counter contents, and an output at which a switching signal appears if the counter contents equalsor exceeds said limit value;
   a fault-free simulation stage means for simulating fault-free operation of said logic circuit driven in common with said simulation stage means, and having an output; and
   a multiplexer including a first input connected to said output of said counter, a second input connected to said output of said output stage means, a third input connected to said output of said fault-free simulation stage means, and an output, said multiplexer normally conducting the output of the output stage means to said multiplexer output and operable in response to said switching signal to conduct the output of the fault-free simulation stage means to said multiplexer output.

7. The simulation model of claim 6, wherein:
   said simulation stage means includes said fault-free simulation stage means;
   said output stage means has a data input connected to said stimulation stage means, and a control input;
   said fault-free simulation stage means in s drive stage driven in parallel with said simulation stage means and includes an output connected to said control input of said output stage means, said drive stage producing a first output signal in response to a signal at the inputs of said simulation stage means which is not influenced by the stuck-open fault and causing through-connection of said producing a second output signal in response to a signal input to said simulation stage means at the output of said output stage means; and
   a connection between said output of said drive stage and said resettable counter for initiating the adding in said counter of the clock pulses received via said clock input.

8. The simulation model of claim 7, further comprising:
   an AND gate connected between said detector means said resettable counter and including a first input connected to said detector means and a second input connected to the output of said multiplexer.

9. The simulation model of claim 8, and further comprising:
   an inverter connected to said first input of said AND gate, and a reset input for said resettable counter connected to said inverter.

10. The simulation model of claim 9, wherein:
    said multiplexer includes a further inverter and second and third AND gates each including a first input, a second input and an output, said first inputs connected together via said further inverter, said second input of said second AND gate connected to said output stage means and said second input of said third AND gate connected to said fault-free simulation stage means;
    and a logic circuit connected to said outputs of said second and third AND gates and connected to drive said counter.

11. The simulation model of claim 10, wherein:
    said logic circuit comprises an OR gate including first and second inputs respectively connected to said outputs of said second and third AND gates.

12. The simulation model of claim 11, wherein:
    said simulation stage means includes means operable for performing a NAND function and comprises a first NAND gate and a fourth AND gate, each of said gates including first and second together and said second inputs connected together and each of said commonly connected inputs connected to said logic circuit; and
    an RS flip-flop forming said output stage means and including an S input and an R input, said S input connected to said output of said NAND gate and said R input connected to said output of said AND gate.

13. The simulation model of claim 11, wherein:
    said counter comprises a D flip-flop including a D input and a Q output;
    said D input connected to said detector means; and
    a NAND gate including a first input connected to said Q output, a second input connected to said detector means and an output connected to said multiplexer.

* * * * *